United States Patent Office 3,148,503
Patented Sept. 15, 1964

3,148,503
COMBINED GAS AND STEAM POWER PLANT
Donald C. MacPhail and Ronald A. Tyler, Ottawa, Ontario, Canada, assignors to National Research Council, Ottawa, Ontario, Canada, a body corporate of Canada
Filed May 25, 1960, Ser. No. 31,698
3 Claims. (Cl. 60—39.18)

This invention is directed towards an improved gas turbine power plant, and more particularly a power plant having characteristics rendering it especially adapted for use where part load or standby service is an important consideration, as it is for example in locomotive service.

Gas turbine systems have already had some limited use as locomotive power plants. In general, however, they have held an unfavourable position commercially in comparison with diesel systems for railway traction due largely to the fact that fuel consumption during idling is an appreciable part of full load consumption, and the fact that railway operation requires that locomotives spend an appreciable time at idling.

It is a prime object of the present invention to provide a gas turbine power plant for use in locomotives which substantially reduces this disadvantage, and which yields a combination of an economical idling condition with the ability to deliver a large quantity of power upon demand for quick starting.

Figure 1:
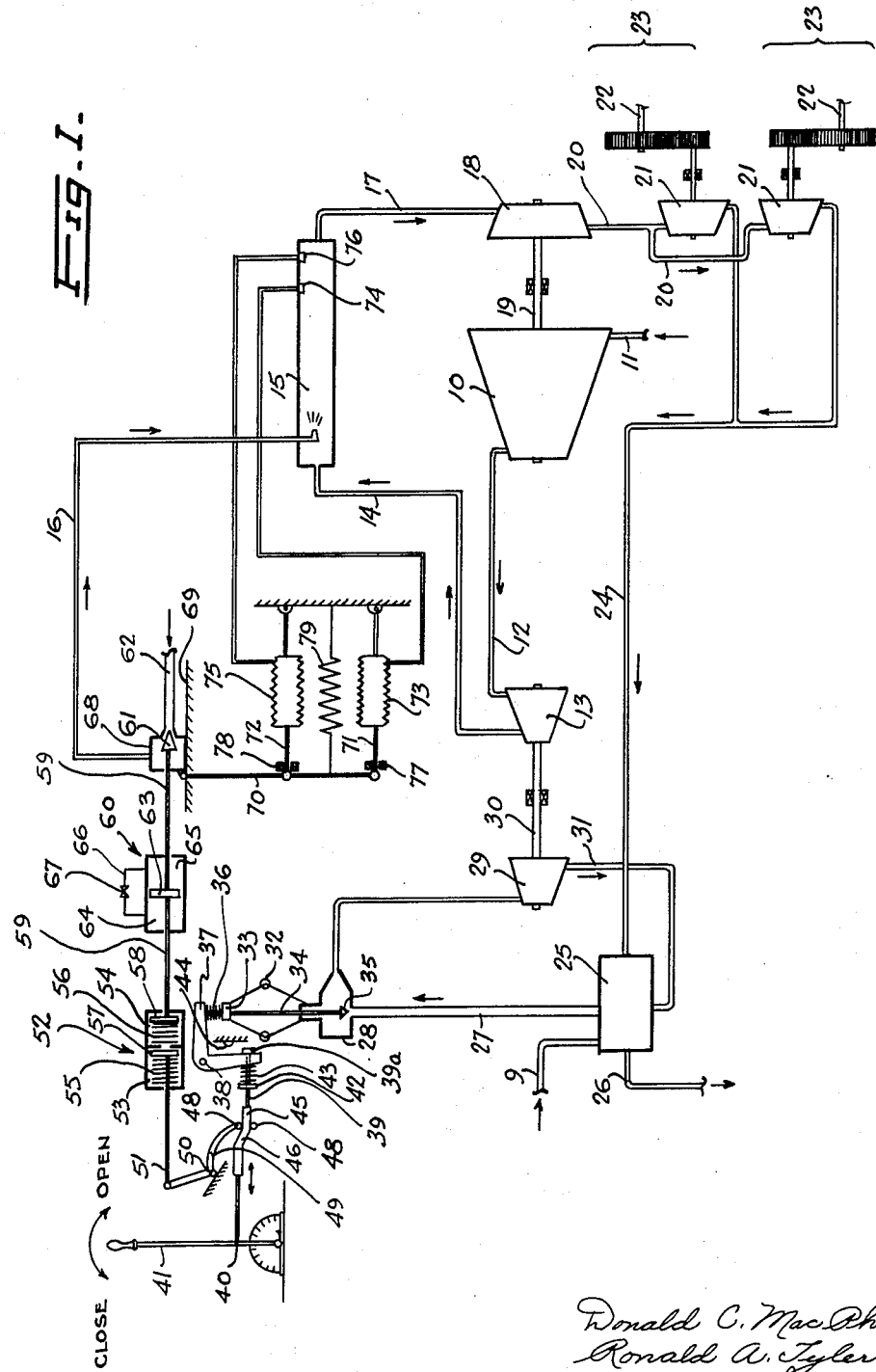
Figure 2:
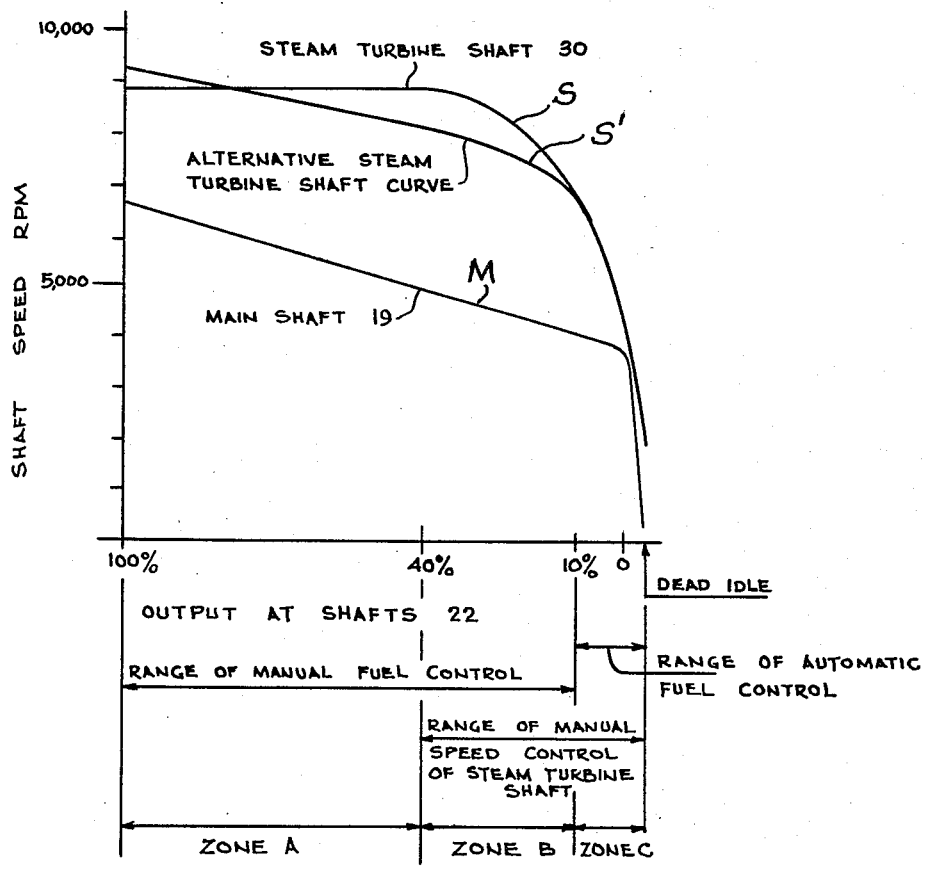

The invention will be further described with the aid of a specific example illustrated in the accompanying drawings. In these drawings:

FIGURE 1 is a diagrammatic representation of the power plant and a possible control system therefor, and
FIGURE 2 is a graph illustrating a possible mode of operation of the power plant.

The apparatus illustrated in FIGURE 1 comprises a low pressure air compressor 10 of conventional design having an intake 11 and outlet 12, the latter communicating with a high pressure compressor 13 also of conventional design, the output 14 of which compressor 13 is passed to a combustor 15 in which oil fuel supplied through line 16 is burnt. The combustor 15 is also of conventional design and its output travels through pipe 17 to a high pressure gas turbine 18 which drives the low pressure compressor 10 through a main shaft 19. The output from high pressure turbine 18 is fed through pipes 20 to one or more (in the example two are shown) output turbines 21 driving shafts 22 through reduction gearing 23, the shafts 22 being connected to the load (not shown), for example the driving axles of a locomotive. If preferred, the output turbines 21 can be arranged in parallel with the gas turbine that drives shaft 19, instead of in series with it, or the turbine 18 could be designed to incorporate the function of power output turbine. In this latter case, the shaft 19 would also be the output shaft and the system would only be suitable for traction if an electrical drive replaced the gearing 23, since shaft 19 is kept idling even when the traction wheels are stopped.

The exhaust from load turbines 21 travels through pipe 24 to a combination boiler and waste heat recuperator 25. Finally, after the available energy from the low pressure gases has been thus extracted, they are exhausted at 26. The recuperator and boiler 25 serves to convert the heat so extracted from the turbine exhaust gases into steam which is made available at pipe 27. Any additional energy needed to maintain a sufficient head of steam may be supplied by burning oil supplied through pipe 9.

From pipe 27 steam flows through a throttle valve 28 to a steam turbine 29 which drives the high pressure compressor 13 through shaft 30. The exhaust steam from the steam turbine 29 may be returned to the recuperator-boiler 25 through pipe 31 as shown, or it may be exhausted to atmosphere.

The opening of the steam valve 28 is controlled by a conventional ball governor 32 driven from the steam turbine shaft 30 which is set for speed manually by the operator in the manner to be described. The sliding sleeve 33 of the governor 32 slides over a rod 34 which carries at its end the valve member 35 which directly regulates the quality of steam admitted to the steam turbine 29. The other end of the rod 34 is secured to one end of a tension spring 36, the other end of which spring is mounted on one arm of a bell-crank lever 37 pivoted at 38. The other arm of the bell-crank lever 37 carries slidingly a rod 39 which is pivotally connected at 40 to a main throttle control lever 41. A stop 42 is secured to the rod 39 and a coil spring 43 is mounted between the stop 42 and the bell crank lever 37. A stop 39a is provided on the extreme end of the rod 39 on the side of the bell-crank lever remote from spring 43. A fixed stop 44 limits anti-clockwise turning of the bell-crank lever 37.

Mounted on the rod 39 is a cam surface having a first, axially extending portion 45, a second, inclined portion 46 and finally a third, axially extending portion which has no function in the operation. Cooperating as a cam follower with these cam surfaces are a pair of rollers 48 mounted on one end of a lever 49 centrally pivotally mounted at 50. At the other arm of the lever 49 there is pivotally connected a control rod 51 which extends into a spring link mechanism 52 that consists of a pair of chambers 53 and 54 each housing a coil spring 55 and 56 respectively. A plate 57 on the end of the control rod 51 is acted on by the spring 55 in the chamber 53, while in the chamber 54 the spring 56 acts on a plate 58 of a second control rod 59 which acts as an extension of the control rod 51.

Control rod 59 extends through a viscous damping unit 60 to carry at its end a valve member 61 that controls the supply of fuel oil from fuel supply line 62 to line 16 leading to combustor 15. Within the viscous damping unit 60 the control rod 59 carries a plunger disc 63 which divides the unit 60 into two chambers 64 and 65. These chambers are filled with liquid and are interconnected by a pipe 66 which includes a valve 67 which can be set to permit a desired rate of flow of liquid between chambers 64 and 65 and thus exert a selected regulation over the rate of travel of the control rod 59.

Valve member 61 controlling the flow of oil to the combustor 15 cooperates with a valve casing 68 which is slidable on the surface 69 in the same direction as the control rod 59. Control over the movement of the valve casing 68 is exerted through a pivotal connection to it of one end of a rod 70 to the remote end of which there is pivotally connected a further rod 71. Yet another rod 72 is pivotally connected to the rod 70 intermediate its connections to rod 71 and valve casing 68.

Rod 71 is connected to an expansible device 73 that is under the control of a thermostat 74 in the combustor 15 set to operate whenever the temperature of the output gases of the combustor falls below a predetermined value, while the rod 72 is connected to an expansible device 75 that is under the control of a thermostat 76 also situated in combustor 15 and set to operate if the output gases assume a temperature above a selected value. When neither of these expansible devices is operated to move its associated rod from the rest position shown in FIGURE 1, the pivotal connections of these rods to the rod 70 are held firmly against respective stops 77 and 78 by a tension spring 79.

The manner of operation of the power plant is as follows:

Air is compressed in the series connection of compressors 10 and 13 and delivered to the combustor 15 where fuel supplied through line 16 is burned to generate high pressure, high temperature output gases in the usual way. Some of the energy of the output gases of the combustor 15 is absorbed in the high pressure turbine 18, being transmitted to the low pressure compressor 10 through the main shaft 19. Further energy is extracted from these gases by the load turbines 21, the remaining usable energy being converted into steam in the recuperator 25 from whence it flows to the steam turbine 29 which drives the high pressure compressor 13 through the steam turbine shaft 30.

In connection with the further description of the operation which follows, reference should be had to FIGURE 2 which illustrates in graphical form typical shaft speeds and other conditions for the plant plotted against various percentages of output power. By "output power" reference is made to the power available at load shafts 22.

FIGURE 1 shows conditions with the throttle lever 41 in a position corresponding to about 10% power. When the throttle is closed even more than this, that is to say the lever 41 is moved anticlockwise, the only effect that this has on the system is to turn the bell-crank 37 clockwise and close the valve member 35 thus admitting less steam to the steam turbine 29. This is the portion of the range of steam control shown in FIGURE 2 and designated as Zone C. There is an automatic temperature control (expansible devices 73 and 75 later described) operative in this zone, which maintains the temperature of the gas and hence of the turbine parts within a predetermined range. During this anticlockwise movement of the throttle lever 41 no change is made in the opening of the fuel valve member 61 which is set in a partially open position so that the combustor 15 is operating at low output.

Now, if on the other hand, the throttle control lever 41 is moved clockwise from the 10% power position to obtain increased power, two events take place. Firstly, the bell-crank lever 37 is turned anticlockwise to increase the opening of steam valve member 35 and admit more steam to the steam turbine 29. This operation takes place in Zone B of FIGURE 2 and ceases at about 40% power output when the bell-crank lever 37 strikes the stop 44, after which it cannot turn further anticlockwise and any additional movement of the rod 39 to the right is absorbed in the spring 43. The second event which follows from clockwise movement of lever 41 is engagement of the rollers 48 by the inclined cam portion 46 so that the lever 49 is rotated anticlockwise to tension the control rod 51. For the purposes of first consideration, let it be assumed that the control rods 51 and 59 are rigidly connected to one another so that this movement to the left of the control rod 51 will correspondingly draw the control rod 59 to the left and hence open the fuel valve member 61 to admit more fuel to the combustor 15 through line 16. The output of the plant will accordingly increase and these conditions will persist through Zone B into Zone A until 100% of rated power is available at the load shafts 22.

It will be observed from FIGURE 2 that the speed of the steam turbine shaft 30 (curve S) remains constant in the higher power range and is essentially at the maximum governed speed. The bell-crank lever 37 has come to rest on stop 44, and, at this point, the governor 32 takes charge of the steam valve member 35 and modifies its position as necessary to ensure a constant rotational speed for the steam turbine shaft 30. The governor 32 performs this function by varying the pressure of its sleeve 33 against the lower end of the spring 36 and hence raising and lowering the rod 34 carrying the valve member 35, since rod 34 is connected to the lower end of such spring.

It will also be observed from FIGURE 2 that the speed of the main shaft 19 increases steadily through Zones B and A due to the increasing amount of fuel being fed to the combustor and the correspondingly greater power being taken from the output gases of the combustor by the turbine 18, such additional power being transmitted to the low pressure compressor 10 through main shaft 19.

The effect of the spring link mechanism 52 and the viscous damping unit 60 is to prevent the valve member 61 being moved more rapidly than the machinery can keep in step with, if the throttle lever 41 is suddenly moved to an extreme position. If this happens the hydraulic impedance to rapid movement provided by the viscous damping unit 60 prevents the control rod 59 following the control rod 51 immediately. If the control rod 51 is moved to the right too quickly, then the play is taken up by the spring 56; if the control rod 51 is moved to the left too quickly, then the play is taken up by the spring 55. Provided no excessively rapid movement is experienced, the rods 51 and 59 act as a rigidly coupled pair of rods as was assumed in the description above.

The thermostats 74 and 76 normally have no effect on the system in Zones A and B. Should, however, the temperature in the combustor 15 rise for some reason above the upper limit set (for example, about 700° C.) the expansible device 75 is actuated to push its rod 72 and hence rotate the rod 70 anticlockwise about its connection to the rod 71 and thus slide the valve casing 68 to the left to reduce the opening in the fuel valve. This movement will reduce the flow of fuel and hence lower the temperature to within the desired limits. Conversely, should the temperature in the combustor 15 fall below a predetermined minimum value (for example 400° C.), the expansible device 73 will operate to push its rod 71 which will rotate the rod 70 clockwise about its connection to the rod 72 thus sliding the valve casing 68 to the right and effectively further opening the fuel valve to admit more fuel to the combustor 15 and hence restore the temperature therein. Maintaining the temperature within these limits reduces thermal fatigue in the parts.

This automatic control is normally only effective in Zone C, although the high temperature thermostat may be operative under conditions of high output. Normally, however, the temperature of the combustor will be comparatively stable when the energy flowing through it is high. It is mainly under idling and near idling conditions that the automatic control is required.

Consider now the performance of the system as it is slowed down from delivering 100% power. The throttle control lever 41 is moved anticlockwise manually from its extreme open position. As the fuel supply is reduced by closure of the fuel valve, the speed of the high pressure turbine 18 gradually falls, the speed of main shaft 19 and the low pressure compressor 10 falling simultaneously. This is Zone A of operation shown in FIGURE 2, and, since there is no change to the steam valve in this range (other than as may be produced by governor 32), the steam turbine shaft 30 continues to rotate at the same speed. At about 40% of power, the speed of the main shaft 19 (curve M) will have dropped to about 80% of its full power speed.

During this reduction in speed of the low pressure compressor 10, the high and low pressure compressors 13 and 10 will have remained fairly well matched, although the speed of compressor 13 will have remained constant. For lower powers the control system is so arranged that the stop 39a on the end of the rod 39 comes to bear against its associated arm of the bell-crank lever 37 to start to turn such lever clockwise and thus changing the set speed of the governor. This happens before the rollers 48 have moved beyond the end of the inclined portion 46 of the cam on the rod 39 so that for a while, as the control lever 41 is moved further towards its closed position, the steam and fuel valves are closed simultaneously and the shaft speeds both fall. This phase of the operation is represented as Zone B extending from approximately 40% power output to 10% power output at the shafts 22.

Further closing movement of the control lever 41 has no further effect on the fuel which is controlled from that point by the thermostat and bellows combination 74-73 which is set to maintain a lower temperature limit. The operation has now entered Zone C. Continued closing movement of the throttle control lever 41 still further restricts flow of steam to the steam turbine 29. The speed of the steam turbine shaft 30 falls in this zone, and the main shaft speed also drops because of the decreased output from the combustor. These conditions prevail until the output power becomes zero. This condition is reached while the main shaft 19 is still rotating at a comparatively high speed, approximately 50% of its full load speed.

This comparatively high idling speed with zero output of power is a common condition in gas turbine power plants and represents the main reason for the lack of economy mentioned above. The combustor is still required to burn a substantial amount of fuel (for example, about 20% of the full load fuel requirement) merely to keep the turbine 18 driving the low pressure compressor 10 to make up the friction and windage losses. Fuel may also be used to make up the losses represented by the comparatively high idling speed of the steam turbine shaft 30 which accompanies the high speed of the main shaft 19 at zero output. It is this wastefulness that the present invention serves to overcome or, at least substantially to reduce. This object is achieved in the present invention by the provision of a second zero output condition known as the "dead idle" condition. Movement from the ordinary zero output to the dead idle zero output condition is effected by still further closing of the steam valve 28, so that the speed of the steam turbine shaft 30 falls even further, and the speed of the main shaft 19 falls with it. The necessary consumption of fuel in the dead idle condition will be low, because the losses will be much less when the shafts are rotating very slowly. The supply of fuel to combustor 15 will be reduced automatically by thermostat 76 and expansible device 75, or, if preferred, there can be provided a further manual fuel control (not shown) for reducing the fuel supply to combustor 15 to a much lower dead idle value (for example, about 2% to 3% of full load fuel consumption).

It will thus be seen that an important feature of the power plant herein described is its ability to operate at this dead idle condition, an ability that is very important for economy in service where stand-by time in relation to operating time is significant, as in railroad traction.

Under these conditions of dead idle in which the air and fuel consumptions are both relatively small, it is practicable to maintain the temperature of the gas and all the parts that normally run hot near their normal operating temperature without a large fuel consumption. Steam can thus be maintained for auxiliary services, as well as for the steam turbine, and the amplitude of thermal cycling of the gas turbine parts is reduced to a minimum, thus increasing their fatigue life.

Another significant aspect of the present invention is that it permits this economical dead idle condition, without losing the ability of the system to accelerate rapidly and deliver a large amount of power on immediate demand.

When accelerating from the dead idle position, the first effect of opening movement of the throttle control lever 41 is to increase the supply of steam to the steam turbine 29 and rapidly increase the speed of rotation of the steam turbine shaft 30 and the high pressure compressor 13. The increase in speed of the high pressure compressor 13 increases the mass flow of air through the combustor 15 which thus quickly delivers more power to turbine 18 to bring the main shaft 19 up to speed with a minimum of delay.

This ability to start up quickly and deliver full power in a matter of seconds is inherent in the present system by virtue of the stored energy in the boiler 25 and the fact that the high pressure compressor 13 driven by the steam turbine 29 has a low inertia and can be accelerated rapidly. As the combustor temperature is then brought up, the coupling forces between the high pressure and low pressure compressor increases and the latter comes up to speed very rapidly.

The compressor work assigned to the steam turbine is determined by the general cycle parameters and is only about 25% of the total. This in turn implies that the steam driven compressor pressure ratio is relatively small. The arrangement as set out, in which the steam turbine drives the high pressure compressor which is in series with and following the low pressure compressor, allows it to work comfortably without stalling because the low pressure stages which normally handle a larger volume of air have considerably larger passages and hence have a low flow resistance. The gas turbine driving the low pressure compressor is designed to match the volume flow out of the high pressure compressor and these two units therefore work very well together giving excellent response to steam and fuel throttle settings.

There is a significant distinction between the present arrangement and an arrangement in which a steam turbine drives a low pressure compressor. In the latter arrangement, the low pressure compressor when brought up to speed would try to force a large volume of low pressure air through the restricted passages of the high pressure compressor and would tend to stall. The acceleration of the unit under these conditions would be much less satisfactory, and blade vibration might also give trouble. To alleviate these problems, the high pressure compressor speed would have to be kept quite high with the result that idling fuel consumption would be approximately the same as for a standard gas turbine cycle.

The existence of the steam supply which is maintained during stand-by conditions makes available several hundred horsepower for rapid and certain starting, thereby removing one of the uncertainties associated with many plants of this nature having a limited starting energy such as that stored in storage batteries or compressed air tanks.

As an alternative to the system shown in FIGURE 1 in which the speed of the steam turbine shaft 30 is maintained constant in Zone A by the governor 32, which arrangement may require supply of additional energy to the boiler 25 by way of fuel pipe 9 to maintain a sufficient head of steam, the governor 32 may be dispensed with together with the auxiliary fuel supply 9 to the boiler. The steam head generated will then be dependent on the quantity of heat energy available for extraction by the boiler 25 from the exhaust gases, and the speed of the shaft 30 will tend to follow the alternative curve S' shown in FIGURE 2. If this modification is adopted, the manual stream throttle control operative in Zones B and C will not be infinitely variable; it will be a simple High and Low type of control. When in "Low" the system will operate under dead idle conditions, when in "High" the position on the curves at which the system will operate will be determined by the manual fuel control which will retain its property of infinite variability. In such a modified system it will be necessary to provide a safeguard against the steam turbine shaft speed falling too low. This can conveniently be accomplished in a conventional manner by providing for supply of auxiliary fuel to the boiler 25 if the steam pressure falls below a predetermined minimum.

It should be understood that the apparatus above described and illustrated in the drawings is presented merely as an example of the invention. The values and ranges shown in FIGURE 2 are typical, but not essential, as numerous variations may be involved. Each particular power plant will be designed to have the specific power output conditions demanded by the load. The boundaries of the various zones may take place at values other than 40% and 10% of output, and the control mechanism may take any structural form that will provide the valve operations required.

The essential aspects of the form of the invention so far described reside in the manner of connecting the various compressors and turbines together with the high pressure compressor on a shaft with the steam turbine and the low pressure compressor on an independent shaft with the gas turbine that is driven by the output gases from the combustor. In this way the comparatively high inertia, low pressure compressor is mounted on a separate shaft from the high pressure compressor. The latter has a much lower inertia and can therefore accelerate rapidly in response to the sudden output of energy that the steam turbine is capable of releasing, without being held back by the low pressure compressor which by its essential nature is inherently slower to accelerate.

In the basic system as previously described, the design pressure ratio across the high pressure compressor will be determined by the selected design values of maximum cycle temperature, steam conditions, and low pressure compressor pressure ratio, all of which are open to arbitrary choice. In particular the design low pressure, pressure ratio can be selected according to the relative importance of running efficiency and capital costs in a particular application. The value may be reduced indefinitely at the expense of efficiency but with advantage to the initial cost of the power plant. At the limit, viz a low pressure pressure ratio of unity, the low pressure compressor and its driving turbine are effectively dispensed with as physical entities resulting in a large saving in the cost of turbomachinery, although the operating efficiency is considerably lower than it would be for a low pressure pressure ratio selected for optimum efficiency. The fundamental characteristics of the power plant, however, are not changed by this procedure.

Thus, in accordance with a further modified form of the present invention, the low pressure compressor 10 may be dispensed with and also, of course, the gas turbine 18. When the system is thus modified, all the compression work will be done by a single compressor which will include both low and high pressure stages, such compressor being driven by the steam turbine shaft. All the useful work available in the hot compressed gas delivered by the combustor 15 is then extracted by the output turbines 21, the exhausts from these output turbines passing to the waste heat recuperator-boiler 25 which supplies steam to the steam turbine driving the compressor.

The system of control suitable for the system as previously described is still basically appropriate to the system without a separate low pressure compressor. The same two control parameters, steam supply and main fuel supply, are available and the same procedure with regard to dead idling. Thus, the same essential advantage, namely an economical dead idle condition combined with ready availability of substantial amounts of power (although with some sacrifice in the speed of start up) is found in this modification. Overall efficiency is somewhat lower, and, as just stated, the speed of start up may not be quite as good as with the full system shown in FIGURE 1, because inevitably it will be necessary to increase the inertia of the rotating machinery on the steam turbine shaft 30. Nevertheless, by virtue of driving the compressor directly from a steam driven turbine, while maintaining the load or output turbine on a separate shaft independent of the steam turbine shaft (so that the latter is free to speed up rapidly) a comparatively fast rate of start up can still be achieved, by reason of the energy stored in the boiler and ready for rapid utilisation.

We claim:
1. A gas turbine power plant comprising a continuous flow combustor, a high pressure, continuous flow air compressor connected to said combustor to supply air directly thereto, a low pressure, continuous flow air compressor connected to said high pressure air compressor to supply air thereto, a gas turbine connected to receive output gas from said combustor, a main shaft interconnecting said gas turbine and said low pressure compressor, a load turbine connected to receive output gas from said combustor, a steam turbine, a steam turbine shaft interconnecting said steam turbine and said high pressure compressor, said steam turbine shaft being independent of said main shaft and driving only said high pressure compressor, steam generating means for supplying steam to said steam turbine, and control means for controlling flow of fuel to said combustor independently of the speed of said steam turbine shaft, said control means including a control mechanism comprising a fuel valve controlling flow of fuel to said combustor, a steam valve controlling flow of steam to said steam turbine, and throttle means for controlling said valves in such a manner that initial opening movement of said throttle means from a dead idle condition opens said steam valve to effect rapid acceleration of said steam turbine shaft with consequent rapid increase of mass flow through said combustor and acceleration of said main shaft, while further opening of said throttle means serves to open said fuel valve to supply more fuel to said combustor to develop greater power at said load turbine.

2. A gas turbine power plant according to claim 1, further including means sensitive to the temperature of the output gas from said combustor, said means being connected to said fuel valve to modify the position of the latter to maintain said temperature within predetermined upper and lower limits.

3. A gas turbine power plant comprising a continuous flow combustor, a continuous flow air compressor connected to said combustor to supply air directly thereto, a load turbine connected to receive output gas from said combustor, a load shaft for connecting said load turbine to a load, a steam turbine, a steam turbine shaft interconnecting said steam turbine and said compressor, said steam turbine shaft being independent of said load shaft and said load turbine and driving only said compressor, steam generating means for supplying steam to said steam turbine, and control means for controlling flow of fuel to said combustor independently of the speed of said steam turbine shaft, said control means including a control mechanism comprising a fuel valve controlling flow of fuel to said combustor, a steam valve controlling flow of steam to said steam turbine, and throttle means for controlling said valves in such a manner that initial opening movement of said throttle means from a dead idle condition opens said steam valve to effect rapid acceleration of said steam turbine shaft with consequent rapid increase of mass flow through said combustor and acceleration of said main shaft, while further opening of said throttle means serves to open said fuel valve to supply more fuel to said combustor to develop greater power at said load turbine.

References Cited in the file of this patent
UNITED STATES PATENTS

| | | |
|---|---|---|
| 2,231,912 | Holzwarth | Feb. 18, 1941 |
| 2,432,177 | Sedille | Dec. 9, 1947 |
| 2,603,063 | Ray | July 15, 1952 |
| 2,675,672 | Schorner | Apr. 20, 1954 |